United States Patent
Sadowski

(10) Patent No.: US 6,499,743 B2
(45) Date of Patent: Dec. 31, 2002

(54) GASKET WITH DYNAMIC JOINT MOTION CONTROL

(75) Inventor: Michael S. Sadowski, Elmhurst, IL (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/824,449

(22) Filed: Apr. 2, 2001

(65) Prior Publication Data

US 2002/0140179 A1 Oct. 3, 2002

(51) Int. Cl.[7] .................................................. F02F 11/00
(52) U.S. Cl. ......................................... 277/593; 277/595
(58) Field of Search ................................. 277/591, 592, 277/593, 594, 595, 598

(56) References Cited

U.S. PATENT DOCUMENTS

| | | |
|---|---|---|
| 3,586,338 A | 6/1971 | Mikiau et al. |
| 3,606,361 A | 9/1971 | Pohl et al. |
| 4,103,913 A | 8/1978 | McDowell |
| 4,721,315 A | 1/1988 | Ueta |
| 5,169,163 A | 12/1992 | Udagaqa et al. |
| 5,211,408 A * | 5/1993 | Udagawa ..................... 277/595 |
| 5,341,779 A | 8/1994 | Chen et al. |
| 5,618,049 A * | 4/1997 | Ueta ........................... 277/595 |
| 5,690,343 A * | 11/1997 | Takada et al. ............... 277/595 |
| 5,695,200 A * | 12/1997 | Diez et al. ................... 277/593 |
| 5,713,580 A * | 2/1998 | Ueta ........................... 277/593 |
| 5,775,701 A * | 7/1998 | Martini ........................ 277/591 |
| 5,863,046 A * | 1/1999 | Diez et al. ................... 277/593 |
| 5,876,038 A * | 3/1999 | Bohm et al. ................. 277/593 |
| 5,895,054 A | 4/1999 | Miyaoh et al. |
| 5,927,724 A * | 7/1999 | Maschmann et al. ........ 277/591 |
| 6,036,194 A | 3/2000 | Stamper |
| 6,058,918 A | 5/2000 | Noetzlin |
| 6,152,456 A * | 11/2000 | Ziegler ........................ 277/593 |

* cited by examiner

*Primary Examiner*—Anthony Knight
*Assistant Examiner*—Vishal Patel
(74) *Attorney, Agent, or Firm*—Reising, Ethington, Barnes, Kisselle, Learman & McCulloch, P.C.

(57) ABSTRACT

A gasket is provided for use between an engine block and a cylinder head of an internal combustion engine. The engine block has a combustion chamber fitted with a liner. A liner seal is compressed between an end of the liner and the cylinder head. The pressure of combustion tends to flex the cylinder head away from the engine block at a location away from the bolts which secure the head to the block, forming a gap. The gasket has an opening adapted to register with the combustion chamber. A thickened ring portion on the gasket surrounds the opening and serves as a load limiter for the seal, takes up the gap between the head and block caused by flexing, and provides a path for unloading combustion forces to limit movement of the liner.

2 Claims, 2 Drawing Sheets

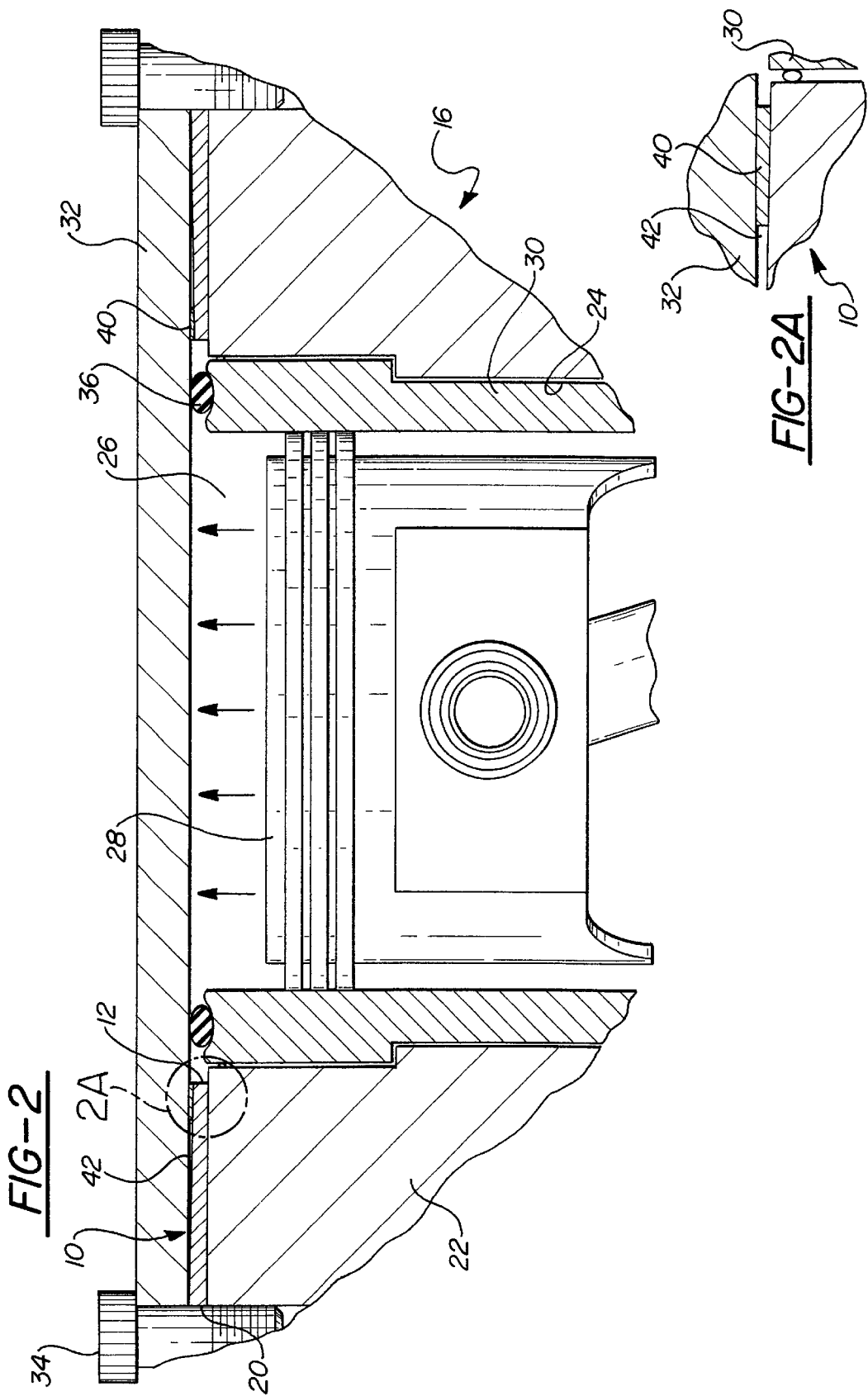

GASKET WITH DYNAMIC JOINT MOTION CONTROL

BACKGROUND OF THE INVENTION

1. Technical Field

This invention relates generally to gaskets for use in internal combustion engines, and more particularly to a gasket for an internal combustion engine having replaceable cylinder liners (for example, heavy-duty diesel engines).

2. Related Art

The pressures in the combustion chamber of an internal combustion engine have a tendency to flex the cylinder head upwardly, except at the location where the cylinder head is bolted to the engine block. Typically, the bolts are spaced away from the combustion chambers of the engine. As a result, the pressures of combustion flex the cylinder head away from the engine block in a region between the bolts and the combustion chamber, producing a gap. In an engine having combustion chamber liners sealed to the cylinder head, as combustion forces unload, there is, because of this gap, a tendency for the forces to drive through the seal and the liner, rather than into the block through the tightly clamped, bolted region. This results in liner movement and wear of the seal.

SUMMARY OF THE INVENTION

A gasket constructed according to the invention includes a gasket plate adapted to be installed between an engine block having a combustion chamber fitted with a liner and a liner seal, and a cylinder head which is bolted to the block at locations spaced from the combustion chamber. The plate has bolt holes for the bolts and an opening surrounding the combustion chamber. An annular thickened portion of the plate is provided immediately adjacent the opening. The thickened portion takes up the gap that forms between the head and block when combustion pressures flex the portion of the cylinder head inwardly of the bolts away from the block. The thickened portion further serves to limit the load on the liner seal and provides a direct unloading path from the head to the block for transmitting the unloading forces as the head portion recovers following flexing.

In one embodiment of the present invention the thickened portion is spaced laterally outwardly of the liner seal and may be provided by an incompressible metal or sintered metal ring which overlies an edge of the gasket around the opening. The effect of this enlarged or thickened portion of the gasket is to serve as a load limiter to limit the load on the liner seal, to take up the gap, and to provide a path for unloading forces generated in the combustion chamber to the engine block. The result is significantly less liner movement and reduced wear on the seal.

In another embodiment of the invention, the gasket comprises a metal carrier plate sandwiched between parallel metal cover plates formed with embossments or sealing beads. The plates of the gasket cooperate to form a seal between the liner and the cylinder head. The carrier plate has an enlarged or thickened portion radially outwardly of the combustion chamber. The enlarged or thickened portion of the carrier plate, in cooperation with the cover plates, has the same general function as the enlarged or thickened portion previously referred to, that is to serve as a load limiter, to take up the gap that may form between the engine block and the cylinder head, and to provide a path for unloading forces generated in the combustion chamber to the engine block. Another thickened portion of the carrier overlies the liner and cooperates with the outer layers to form a seal for the liner.

In addition to the above objects and advantages, the gasket has the further advantages of being of relatively simple construction, rugged and durable in use, being inexpensively manufactured and easily installed.

These and other objects, features and advantages of the invention will become more apparent when considering the following description and accompanying drawings.

THE DRAWINGS

FIG. 2 is a fragmentary sectional view of the gasket shown clamped between the engine block and cylinder head;

FIG. 2A is an enlargement of a portion of FIG. 2 within the circle 2A.

DETAILED DESCRIPTION

Figure 1:
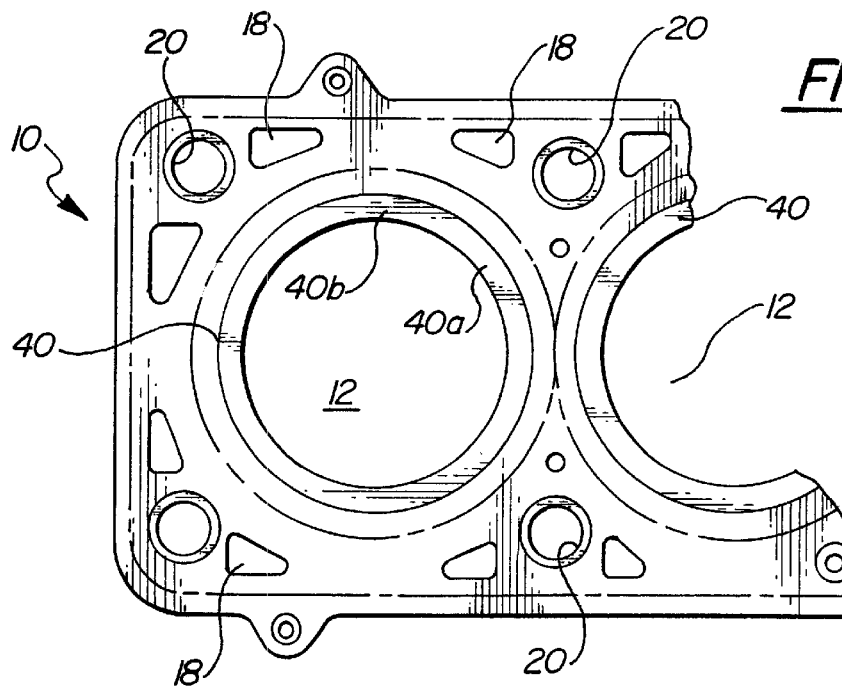
FIG. 1 is a fragmentary plan view of a gasket constructed in accordance with the invention.

Referring now more particularly to the drawings and especially to FIGS. 1, 2 and 2A, a gasket 10 constructed according to a first presently preferred embodiment of the invention is shown having openings 12 adapted to extend about the cylinders of an internal combustion engine 16, such, for example, as a diesel engine. The gasket also has one or more cooling openings 18 and one or more bolt holes 20 spaced from the openings 12. The gasket 10 is preferably in the form of a flat metal plate made of steel or the like.

The engine 16 includes an engine block 22 having cylinders 24, one of which is shown in the drawings as defining a combustion chamber 26. A piston 28 is reciprocal in the cylinder 24. A cylindrical liner 30 lines the combustion chamber 26. The engine also includes a cylinder head 32 secured to the engine block 22 by a plurality of bolts 34. The gasket 10 is disposed between the engine block 22 and the cylinder head 32, with the bolts 34 passing through the bolt holes 20 in the gasket 10, to clamp the gasket 10 tightly between the engine block 22 and the cylinder head 32.

When clamped between the engine block 22 and cylinder head 32, the gasket opening 12 extends about the combustion chamber 26.

An annular ring-like seal or crush ring 36 of copper or the like is interposed and compressed between the upper end of the liner 30 and the cylinder head 32. The seal 36 closes and seals off the space between the upper end of the liner 30 and the cylinder head 32.

The gasket 10 includes a thickened portion in the preferred form of a thin, flat, incompressible, continuous ring 40 of metal or sintered metal extending about the opening 12 in close proximity thereto and clamped between the body of the gasket 10 and the cylinder head 32. The ring 40 may be formed separately from the body of the gasket 10 and secured thereto by any suitable means, or formed as a thickened region of the gasket body. This ring 40 adds a thickness to the dimension of the body of the gasket 10 and may sometimes be referred to herein as a thickened or enlarged portion of the gasket. The purpose of the thickened or enlarged portion of the gasket is to take up or fill the gap 42 which will develop between engine block 22 and the cylinder head 32 in the region between the bolts 34 and combustion chamber 26 when the cylinder head flexes away from the engine block in response to the pressures of combustion in the combustion chamber. Such pressures will produce the gap in the absence of the ring 40. As the combustion forces unload, there is a tendency for such forces to drive through the seal 36 and the liner 30 rather than into the engine block 22 through the tightly clamped bolted region. This results in liner movement and wear of the liner seal 36.

The presence of the ring 40 flexes the cylinder head, as shown exaggerated in FIG. 2A, to initially establish and fill the gap 42. The gap is thus already present when the forces of combustion in the combustion chamber occur, but the gap is filled by the ring 40 and is not increased in size by the compression forces.

The effect of this enlarged or thickened portion of the gasket 10, provided by the ring 40, is to serve not only as a load limiter to limit the load on and hence the compression of the seal 36, but also to take up or fill the gap 42 as well as to provide a path immediately adjacent the opening 12 and thus the liner for unloading forces generated in the combustion chamber 26 to the engine block 22 rather than being transmitted though the liner. The ring 40 increases the gasket thickness close to the combustion chamber, so that unloading forces produce very little liner movement and accordingly much less seal wear.

Figure 3:
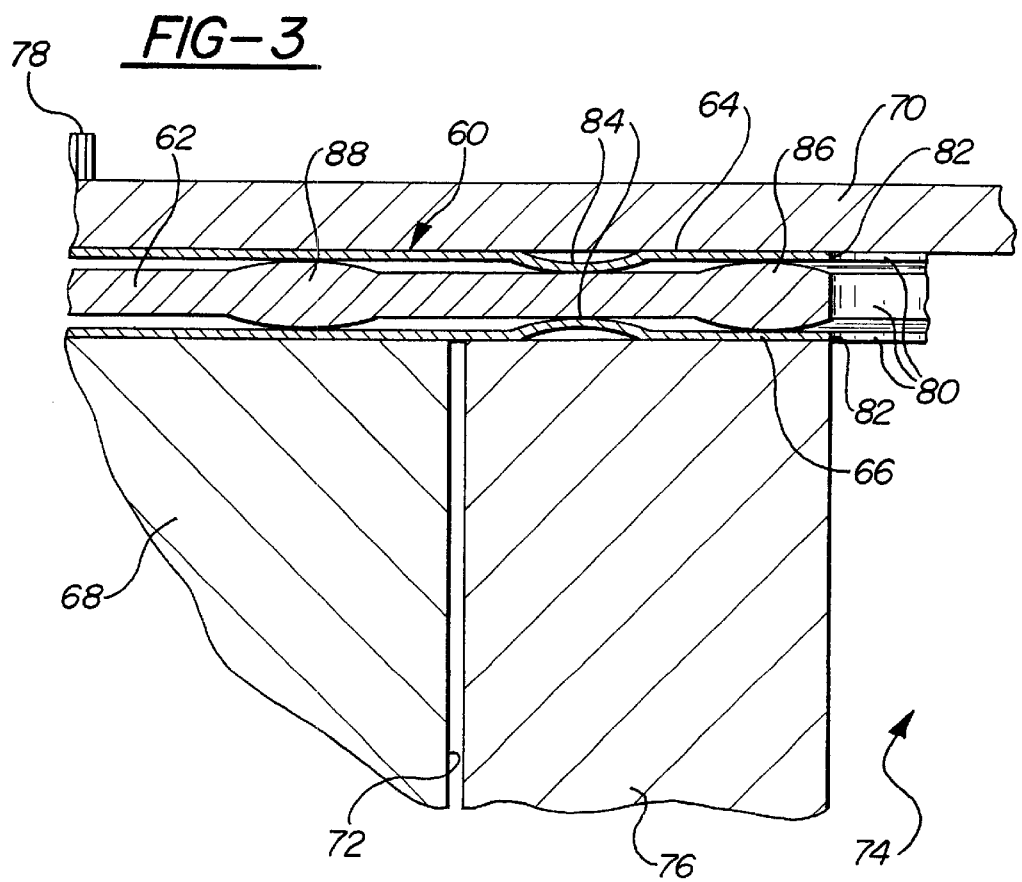
FIG. 3 is a fragmentary sectional view of an alternative embodiment of the invention.

FIG. 3 shows a modification of the invention in which a gasket 60 of a multi-layer metal construction is shown, comprising a carrier plate 62, preferably made of steel, sandwiched between parallel, flat outer cover plates 64 and 66. The cover plates 64 and 66 may be made of thin sheets of spring steel or the like. The gasket 60 is received between an engine block 68 and a cylinder head 70. The engine block 68 and cylinder head 70 are of substantially the same construction as the engine block 22 and cylinder head 32 shown in FIG. 2.

The engine block 68 has a cylinder 72 which defines a combustion chamber 74. A cylinder liner 76 lines the combustion chamber 74. The cylinder head 70 is secured to the engine block 68 by bolts 78 passing through holes (not shown but comparable to the holes 20 of FIG. 1) in the gasket to clamp the gasket 60 between the engine block and cylinder head.

The plates 62, 64 and 66 of the gasket 60 have registering openings 80 surrounding the combustion chamber 74. The edges 82 of the openings 80 substantially coincide or register with the radially inner surface of the liner 76, so that the gasket overlies the upper end of the liner as well as the engine block.

The cover plates 64 and 66 are formed with resilient annular beads 84 which extend around, and are spaced radially outwardly of, the openings 80, at a point above the upper end of the liner 76. The beads 84 are concentric with the openings 80 and are in the form of arcuate deformations which extend toward the carrier plate 62 in resilient, pressure contact with the carrier plate. The beads 84 are substantially in registration with one another.

The carrier plate 62 is formed with a continuous, annular, enlarged or thickened portion 86 spaced radially inwardly of the beads 84, and with a continuous, annular, enlarged or thickened portion 88 spaced radially outwardly of the beads. The enlarged or thickened portions 86 and 88 are concentric with the openings 80 in the plates 62, 64 and 66. The enlarged or thickened portions 86 and 88 contact the cover plates 66 and 68, and serve as load or deformation limiters protecting the beads 84 against excessive compression stress. Except for the portions 86 and 88, which are integral formations of the carrier plate 62, the carrier plate is a planar member.

The cover plates 64 and 66 are in sealing contact with the cylinder head 70 and the liner 76, and the beads 84 have a sealing contact with the carrier plate 62, thus sealing the space between the end of the liner 76 and the cylinder head.

The enlarged or thickened portion 88 serves not only as a load limiter for the beads 84, but also serves to take up the gap which tends to form between the engine block 68 and cylinder head 70 in response to pressures of combustion, and to provide a path for unloading forces generated in the combustion chamber to the engine block. The enlarged or thickened portion 86, being radially inward of the beads 84, is not relied upon for these latter functions but as a seal for the liner.

The thickened portion 88 may have a variable thickness in the circumferential direction to account for corresponding variations in the flexure of the head. The head 70 deflects a greater amount at locations away from the bolts 78, and thus the thickened portion 88 may preferably be thicker in these areas away from the bolts than areas nearer to the bolts. 40a of FIG. 1 represents the relatively thinner regions of portion 88 nearest the bolt holes 20, whereas 40b represents the thicker regions spaced further from the holes 20 where greater deflection is expected.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A multi-layer metal gasket for use between an engine block and a cylinder head of an internal combustion engine, wherein the engine block has a combustion chamber, the cylinder head extends over and closes the combustion chamber, the combustion chamber has a liner defining a combustion opening, and bolts spaced outwardly from the combustion chamber securing the cylinder head to the engine block such that pressures in the combustion chamber tend to flex a portion of the cylinder head between the bolts and the combustion chamber away from the engine block forming a gap between the portion of the cylinder head and the engine block, said gasket comprising:

a carrier plate sandwiched between parallel cover plates;

said plates having registered openings;

said cover plates having opposing aligned, concentric, annular sealing beads surrounding said opening in radially outwardly spaced relation thereto;

said gasket being adapted to be received between the cylinder head and the engine block with one of said cover plates in contact with the cylinder head, with the other of said cover plates in contact with the engine block and the liner, and with said registered openings surrounding the combustion opening;

said plates of said gasket cooperating to form a seal between the liner and the cylinder head; and said carrier plate having an annular thickened portion surrounding said combustion opening and disposed on a radially outer side of said beads serving as a load limiter to limit the load on said seal, to take up the gap between the head and the block, and to provide a path from the head to the block for unloading forces generated in the combustion chamber, said carrier plate having a second annular thickened portion surrounding said combustion opening and disposed on a radially inner side of said beads serving as a seal for the liner.

2. The gasket of claim 1, wherein said thickened portions are radially spaced and comprise continuous, annular, integral formations of said carrier plate concentric with said beads.

* * * * *